United States Patent
Shin

(10) Patent No.: US 11,548,240 B2
(45) Date of Patent: Jan. 10, 2023

(54) APPARATUS AND METHOD FOR COMPOSITE MATERIAL

(71) Applicant: Dong Soo Shin, Gwangmyeong-si (KR)

(72) Inventor: Dong Soo Shin, Gwangmyeong-si (KR)

( * ) Notice: Subject to any disclaimer, the term of this patent is extended or adjusted under 35 U.S.C. 154(b) by 0 days.

(21) Appl. No.: 17/266,616

(22) PCT Filed: Aug. 22, 2019

(86) PCT No.: PCT/KR2019/010684
§ 371 (c)(1),
(2) Date: Feb. 8, 2021

(87) PCT Pub. No.: WO2020/045895
PCT Pub. Date: Mar. 5, 2020

(65) Prior Publication Data
US 2021/0291464 A1   Sep. 23, 2021

(30) Foreign Application Priority Data

Aug. 31, 2018  (KR) .................. 10-2018-0103563

(51) Int. Cl.
| | |
|---|---|
| B29C 70/00 | (2006.01) |
| B29B 7/00 | (2006.01) |
| B29B 13/00 | (2006.01) |
| B29C 70/34 | (2006.01) |
| B29B 7/90 | (2006.01) |
| B29B 13/10 | (2006.01) |
| B29C 70/54 | (2006.01) |
| B29K 105/26 | (2006.01) |
| B29L 7/00 | (2006.01) |

(52) U.S. Cl.
CPC .............. *B29C 70/342* (2013.01); *B29B 7/90* (2013.01); *B29B 13/10* (2013.01); *B29C 70/54* (2013.01); *B29K 2105/26* (2013.01); *B29L 2007/002* (2013.01)

(58) Field of Classification Search
CPC ......... B29C 70/00; B29C 70/30; B29C 70/34; B29C 70/342; B29C 70/50; B29C 70/54; B29B 7/00; B29B 7/90; B29B 13/00; B29B 13/10
See application file for complete search history.

(56) References Cited

FOREIGN PATENT DOCUMENTS

| CN | 206635507 U | 11/2017 |
|---|---|---|
| JP | 57-28135 A | 2/1982 |

(Continued)

OTHER PUBLICATIONS

International Search Report for PCT/KR2019/010684 dated Dec. 4, 2019 from Korean Intellectual Property Office.

*Primary Examiner* — Jacob T Minskey
*Assistant Examiner* — Matthew Hoover
(74) *Attorney, Agent, or Firm* — Revolution IP, PLLC

(57) ABSTRACT

The present invention provides an apparatus for recycling composite material and a method for recycling composite material by using same, the apparatus including: a mixing tank in which pulverized products of fiber-reinforced waste plastic are dispersed and mixed in water together with a filler, thereby forming a composite material mixture; a fixing agent addition part for forming a recyclable material by supplying, to the composite material mixture, a fixing agent that aggregates the pulverized products of the fiber-reinforced waste plastic and the filler; and a filtering tank in which the recyclable material is supplied such that a recyclable composite sheet is formed.

2 Claims, 4 Drawing Sheets

(56) References Cited

FOREIGN PATENT DOCUMENTS

| | | | |
|---|---|---|---|
| JP | 5648275 | B2 | 1/2015 |
| KR | 10-2008-0010750 | A | 1/2008 |
| KR | 10-1035150 | B1 | 5/2011 |
| KR | 10-1369092 | B1 | 3/2014 |
| KR | 10-2015-0010300 | A | 1/2015 |
| KR | 10-1584171 | B1 | 1/2016 |
| KR | 10-1785245 | B1 | 10/2017 |

US 11,548,240 B2

APPARATUS AND METHOD FOR COMPOSITE MATERIAL

TECHNICAL FIELD

The present invention relates to technology of recycling a composite material, and more particularly, to an apparatus and a method for recycling fiber-reinforced plastic (FRP).

BACKGROUND ART

Fiber-reinforced plastic (FRP) is a composite material in which fiber such as glass fiber or carbon fiber is used as reinforced materials in a matrix such as phenol resin or epoxy resin.

In particular, carbon fiber-reinforced plastic (CFRP), which uses carbon fiber as a reinforced material, is ⅕ lighter than iron, 10 times stronger than iron, is a high-strength/high-elasticity advanced material with excellent impact resistance and heat resistance, and is used in various industrial fields such as aerospace, ship, vehicle and civil engineering, architecture, and the like. Since such carbon fiber-reinforced plastic is an expensive material, a lot of effort has been made to develop a technology for recovering and reusing carbon fibers in a disposal step. Until now, technologies for recovering carbon fibers from waste carbon fiber-reinforced plastics include chemical methods using acids and organic solvents, thermal methods for thermal decomposition of resins, and supercritical methods. However, this method not only has environmental problems, but also shows problems such as surface defects and strength reduction of carbon fibers.

DETAILED DESCRIPTION OF THE INVENTION

Technical Problem

The present invention provides an apparatus and a method for recycling waste fiber-reinforced plastic (FRP) economically and eco-friendly.

Technical Solution

According to an aspect of the present invention, there is provided an apparatus for recycling a composite material, the apparatus including: a mixing tank in which pulverized products of waste fiber-reinforced plastic are dispersed and mixed in water together with a filler to form a composite material mixture; a fixing agent addition part for supplying a fixing agent for aggregating the pulverized products of waste fiber-reinforced plastic and the filler to the nonwoven fabric mixture to form a recyclable material; and a filter tank in which the recyclable material supplied thereto is received so that a recyclable composite sheet is formed, wherein the filter tank includes a filter tank body for providing an inner space, and a filter net horizontally installed in the inner space so as to divide the inner space into an upper space and a lower space and allowing water in the recyclable material to pass therethrough downward, and the recyclable material is to supplied to the upper space.

According to another aspect of the present invention, there is provided a method of recycling a composite material, the method including: a waste composite material pulverizing operation of pulverizing waste fiber-reinforced plastic to obtain pulverized products of waste fiber-reinforced plastic; a material mixing operation of dispersing and mixing the pulverized products of waste fiber-reinforced plastic in water together with a filler to obtain a composite material mixture; a fixing agent adding operation of supplying the fixing agent for aggregating the pulverized products of waste fiber-reinforced plastic and the filler to the composite material mixture to form a recyclable material; a raw material injecting operation of injecting the recyclable material into an upper space of the filter tank, wherein the filter tank includes a filter tank main body for providing an inner space and a filter net horizontally installed in the inner space so as to divide the inner space into the upper space and a lower space and allowing water in the recyclable material to pass therethrough downward; and a draining operation of draining water from the lower space to form a recyclable composite sheet on the filter net.

Effects of the Invention

According to the present invention, all the objectives of the present invention described above can be achieved. Specifically, since a fixing agent is added to a composite material mixture formed by mixing pulverized products of waste fiber-reinforced plastic in water together with a filler and then supplied to a filter tank to obtain a recyclable composite sheet through a drainage process, the process can be simplified compared to a related art, and accordingly, costs can be reduced, productivity can be improved, and eco-friendly recycling is possible.

MODE OF THE INVENTION

Hereinafter, the configuration and operation of embodiments of the present invention will be described with reference to the accompanying drawings.

Figure 1:
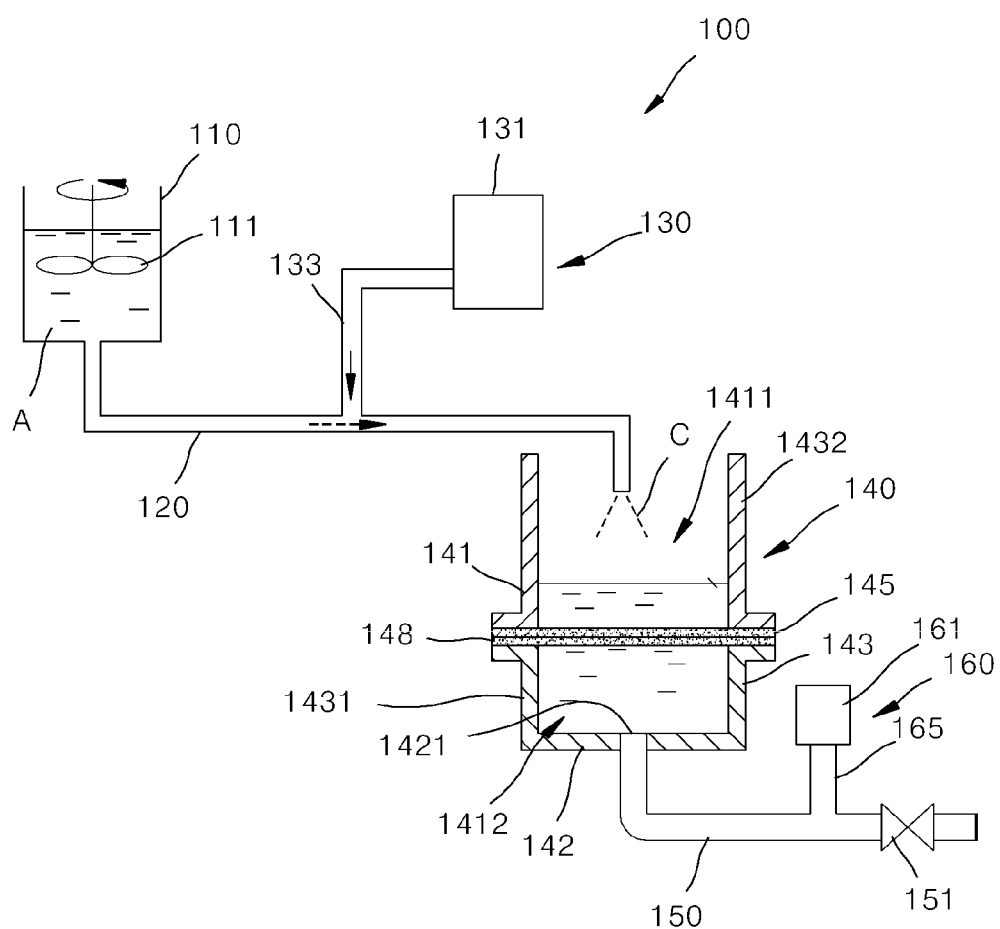
FIG. 1 is a view schematically illustrating an apparatus for recycling a composite material according to an embodiment of the present invention.

FIG. 1 is a view schematically illustrating an apparatus for recycling a composite material according to an embodiment of the present invention. Referring to FIG. 1, an apparatus 100 for recycling a composite material according to an embodiment of the present invention includes a mixing tank 110 in which pulverized products of waste fiber-reinforced plastic are dispersed and mixed in water together with a filler to form a composite material mixture, a mixture transfer pipe 120 through which the composite material mixture is discharged from the mixing tank 110 and transferred, a fixing agent addition part 130 for adding a fixing agent to the composite material mixture discharged from the mixing tank 110 on the mixture transfer pipe 120, a filter tank 140 in which a recyclable composite sheet is formed by using a recyclable material formed by adding the fixing agent to the composite material mixture, a drainage pipe 150 through which water is discharged from the filter tank 140, and a vacuum forming unit 160 connected to the drainage pipe 150.

In the mixing tank 110, the pulverized products of waste fiber-reinforced plastic are dispersed and mixed in water together with the filler to form a composite material mixture A. To this end, the mixing tank 110 includes an agitating unit 111. The pulverized products of waste fiber-reinforced plastic are obtained by finely pulverizing a chip or fiber-reinforced plastic waste generated in the manufacturing process of a fiber-reinforced plastic product such as carbon fiber-reinforced plastic or glass fiber-reinforced plastic by using a pulverizer, and it is preferable that the same type is used. It is preferable that the pulverized products of waste fiber-reinforced plastic have a length of 10 mm or less. In the present invention, fiber used as a reinforced material of fiber-reinforced plastic includes aramid fiber and natural fiber in addition to carbon fiber and glass fiber, and resin used as a matrix includes all of synthetic resin and natural resin. As the filler, various functional fillers including resin materials for bonding and controlling properties of the pulverized products of waste fiber-reinforced plastic are used. In the mixing tank 110, the pulverized products of waste fiber-reinforced plastic and the filler are supplied in a state in which the mixing tank 110 is filled with water, and the pulverized products of waste fiber-reinforced plastic and the filler supplied to water are evenly dispersed and mixed in water by the agitating unit 111. In the present embodiment, the pulverized products of waste fiber-reinforced plastic and the filler in the composite material mixture A have a weight ratio of 8:2. In addition, a complementary material may be added to improve the performance of the pulverized products of waste fiber-reinforced plastic. As a complementary material, fibers including natural fibers other than carbon fiber, glass fiber, aramid fiber, powder resin material, or natural resin may be used. In the case of fibers, short cut fibers may be used.

The composite material mixture A discharged from the mixing tank 110 is transferred to the filter tank 140 through the mixture transfer pipe 120. To this end, although not shown, the mixture transfer pipe 120 includes a transfer pump and an opening/closing valve for transferring the composite material mixture A. The fixing agent addition part 130 is connected to the mixture transfer pipe 120 so that the fixing agent is supplied to the composite material mixture A flowing through the transfer pipe 120.

The fixing agent addition part 130 supplies the fixing agent to the mixture transfer pipe 120 to add the fixing agent to the composite material mixture A flowing in the mixture transfer pipe 120. The pulverized products of waste fiber-reinforced plastic included in the composite material mixture A are structurally aggregated by the fixing agent added to the composite material mixture A through the fixing agent addition part 130 and thus may be fixed to each other. The fixing agent may be one commonly used, such as polyvinyl acetate resin and sodium thiosulfate. The fixing agent addition part 130 includes a fixing agent storage tank 131 in which the fixing agent is stored, and a fixing agent supply pipe 133 that connects the fixing agent storage tank 131 to the mixture transfer pipe 120 and supplies the fixing agent stored in the fixing agent storage tank 131 to the mixture transfer pipe 120. Although not shown, the fixing agent addition part 130 further includes a pump for supplying the fixing agent stored in the fixing agent storage tank 131 to the mixture transfer pipe 120 through the fixing agent supply pipe 133, and an opening/closing valve for opening and closing the fixing agent supply pipe 133. In the present invention, the addition of the fixing agent to the composite material mixture A is referred to as a recyclable material.

In the filter tank 140, the recyclable composite sheet is manufactured by using the recyclable material formed by adding the fixing agent to the composite material mixture. The filter tank 140 includes a filter tank main body 141, a filter net 145 installed inside the filter tank main body 141, and a net support body 148 installed inside the filter tank main body 141 to support the filter net 145.

The filter tank main body 141 includes a bottom 142 and a sidewall 143 extending upwardly from the bottom 142. The bottom 142 is provided with a drainage port 1421 for drainage. The sidewall 143 includes an upper sidewall 1432 that is detachably coupled up and down, and a lower sidewall 1431 formed integrally with the bottom 142. The filter net 145 and the net support body 148 are installed between the upper sidewall 1432 and the lower sidewall 1431. The inner space of the filter tank main body 141 is divided into an upper space 1411 and a lower space 1412 by the filter net 145.

The filter net 145 is installed so as to be horizontally disposed inside the filter tank main body 141. Specifically, the filter net 145 is detachably coupled between the upper sidewall 1432 and the lower sidewall 1431. The filter net 145 allows water that is the rest of the recyclable material to pass, except for the aggregate of the pulverized products of waste fiber-reinforced plastic and the filler. Water is drained downwardly by the filter net 145, and a recyclable composite sheet made of the aggregate of the pulverized products of waste fiber-reinforced plastic and the filler remains on the top. The filter net 145 is structurally supported by the net support body 148.

The net body support 148 is installed inside the filter tank main body 141 to support the filter net 145. Specifically, the net support body 148 is detachably coupled between the upper side wall 1432 and the lower side wall 1431 and is positioned under the filter net 145 to structurally support the filter net 145.

The drainage pipe 150 extends from the drainage port 1421 formed in the bottom 142 of the filter tank main body 141. Water is discharged to the outside from the inner space of the filter tank main body 141 through the drainage pipe 150. A drainage valve 151 for opening and closing the drain pipe 150 is installed in the drainage pipe 150. In the present embodiment, it is described that water is drained through the drainage pipe 150 by its own weight. Unlike this, a drainage pump may be installed so that water may be drained by the drainage pump. The vacuum forming unit 160 is connected to the drainage pipe 150.

The vacuum forming unit 160 discharges air inside the filter tank 140 to the outside through the drainage pipe 150 to form a vacuum in the lower space 1412 of the filter tank 140. The vacuum forming unit 160 includes a vacuum pump 161 and a connection pipe 165 connecting the vacuum pump 161 and the drainage pipe 150. A portion to which the connection pipe 165 and the drainage pipe 150 are connected, is located upstream of the drainage valve 151. The vacuum pump 161 operates to form a vacuum state in the lower space 1412 of the filter tank 140, thereby reducing moisture in the recyclable composite sheet formed on the filter net 145.

Figure 2:
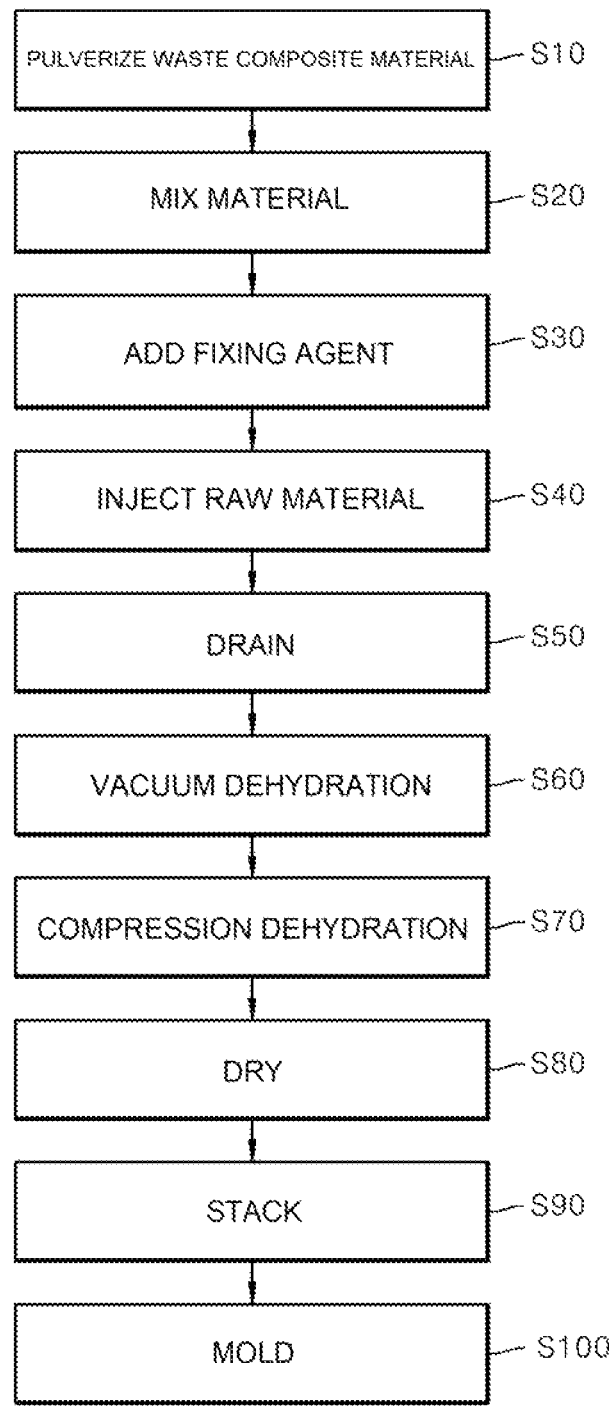
FIG. 2 is a flowchart illustrating a method of recycling a composite material according to an embodiment of the present invention using the apparatus for recycling a composite material shown in FIG. 1.

FIG. 2 is a flowchart illustrating a method of recycling a composite material according to an embodiment of the present invention using the apparatus for recycling a composite material shown in FIG. 1. A description of the method for recycling a composite material shown in FIG. 2 will also include a description of the operation of the apparatus for recycling a composite material shown in FIG. 1. Referring to FIG. 2, the method of recycling a composite material according to an embodiment of the present invention includes a waste composite material pulverizing operation (S10) of pulverizing waste fiber-reinforced plastic to obtain pulverized products of waste fiber-reinforced plastic, a material mixing operation (S20) of dispersing and mixing the pulverized products of waste fiber-reinforced plastic, which is obtained through the waste composite material pulverizing operation (S10), in water together with a filler to obtain a nonwoven fabric mixture, a fixing agent adding operation (S30) of adding a fixing agent to the composite material mixture obtained through the material mixing operation (S20) to prepare a recyclable material, a raw material injecting operation (S40) of injecting the recyclable material prepared through the fixing agent adding operation (S30) into a filter tank, a draining operation (S50) of draining water from the filter tank to form a recyclable composite sheet, a vacuum dehydration operation (S60) of reducing moisture in the recyclable composite sheet by forming a vacuum in the filter tank, a compression dehydration operation (S70) of compressing and dehydrating the recyclable composite sheet that has undergone the vacuum dehydration operation (S60), a drying operation (S80) of drying the recyclable composite sheet that has undergone the compression dehydration operation (S70), a stacking operation (S90) of stacking a plurality of recyclable composite sheets that have undergone the drying operation (S80), and a molding operation (S100) of molding a laminate formed in the stacking operation (90). The material mixing operation (S20), the fixing agent adding operation (S30), the raw material injecting operation (S40), the draining operation (S50), and the vacuum dehydration operation (S60) may be performed by using the apparatus 100 for recycling a composite material according to an embodiment of the present invention described with reference to FIG. 1.

In the waste composite material pulverizing operation (S10), the chip or fiber-reinforced plastic waste generated in the manufacturing process of the fiber-reinforced plastic product is pulverized by a pulverizer to form pulverized products of waste fiber-reinforced plastic. In the waste composite material pulverizing operation (S10), the pulverized products of waste fiber-reinforced plastic may be preferably pulverized to have a length of 10 mm or less.

In the material mixing operation (S20), the pulverized products of waste fiber-reinforced plastic obtained through the waste composite material pulverizing operation (S10) are dispersed and mixed in water together with the filler to obtain a composite material mixture. The material mixing operation (S20) is performed in the mixing tank 110 of the apparatus for recycling a composite material shown in FIG. 1. In the mixing tank 110, the pulverized products of waste fiber-reinforced plastic are dispersed and mixed in water together with the filler to form the composite material mixture A. It is preferable that the pulverized products of waste fiber-reinforced plastic used in the material mixing operation (S20) have the same properties. As the filler, various functional fillers including resin materials for bonding and controlling properties of the pulverized products of waste fiber-reinforced plastic are used. In the mixing tank 110, the pulverized products of waste fiber-reinforced plastic and the filler are supplied in a state in which the mixing tank 110 is filled with water, and the pulverized products of waste fiber-reinforced plastic and the filler supplied to the water are evenly dispersed and mixed in water by the agitating unit 111. In the present embodiment, the pulverized products of waste fiber-reinforced plastic and the filler in the composite material mixture A have a weight ratio of 8:2. In addition, a complementary material may be added to improve the performance of the pulverized products of waste fiber-reinforced plastic pulverized in the material mixing operation (S20). As a complementary material, fibers including natural fibers other than carbon fiber, glass fiber, aramid fiber, powder resin material, or natural resin may be used. In the case of fibers, short cut fibers may be used.

In the fixing agent adding step (S30), the fixing agent is added to the composite material mixture A obtained through the material mixing operation (20) to prepare a recyclable material. The fixing agent adding operation (S30) is performed by operating the fixing agent addition part 130 in the process of moving the composite material mixture A stored in the mixing tank 110 in the apparatus 100 for recycling a composite material shown in FIG. 1 to the filter tank 140 through the mixture transfer pipe 120. The fixing agent adding part 130 supplies the fixing agent to the mixture transfer pipe 120 to add the fixing agent to the composite material mixture A flowing in the mixture transfer pipe 120. The pulverized products of waste fiber-reinforced plastic contained in the composite material mixture A are structurally aggregated by the fixing agent added to the composite material mixture A through the fixing agent addition part 130 and thus may be fixed to each other. The fixing agent may be one commonly used, such as polyvinyl acetate resin and sodium thiosulfate.

In the raw material injecting operation (S40), the recyclable material prepared through the fixing agent adding operation (S30) is injected into the filter tank. When the raw material injecting operation (S40) is described in more detail with reference to FIG. 1, the recyclable material C is discharged from the transfer pipe 120 in a state in which water is filled higher than the filter net 145 in the filter tank 140, and an appropriate amount is supplied to the upper space 1411 of the filter tank 140. The recyclable material injected into the filter tank 140 is present only in the upper space 1411 by the filter net 145.

Figure 3:
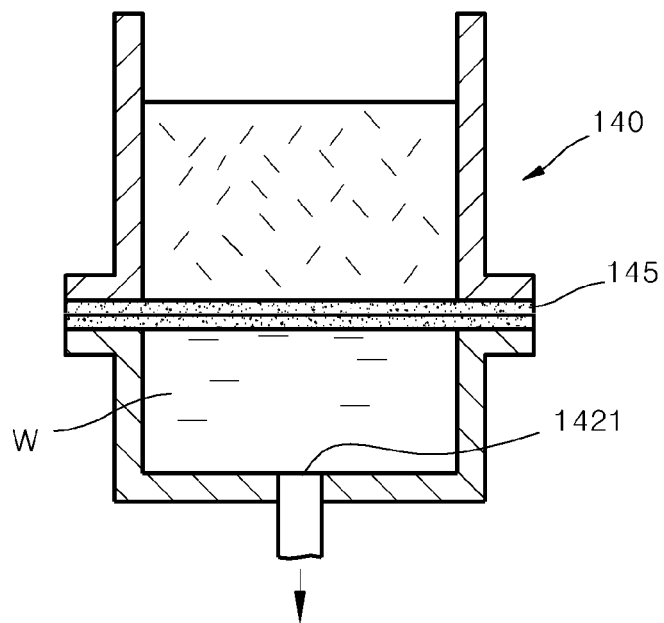
FIG. 3 illustrates the state of a filter tank when a draining operation of the method of recycling a composite material of FIG. 2 is performed.
Figure 4:
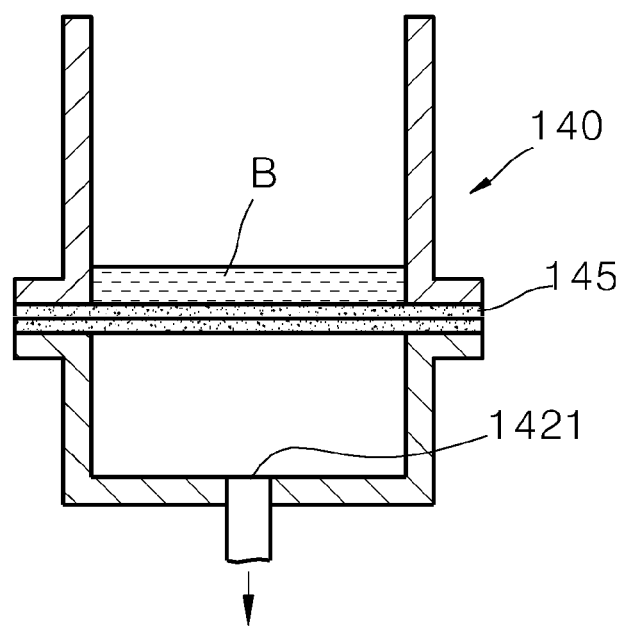
FIG. 4 illustrates the state of the filter tank when a vacuum dehydration operation of the method of recycling a composite material of FIG. 2 is performed.

In the draining operation (S50), as shown in FIG. 3, water is drained from the filter tank 140 through the drainage port 1421. The draining operation S50 is performed by opening the drainage valve 151 installed in the drainage pipe 150. After the water in the filter tank 140 is completely drained through the draining operation (S50), as shown in FIG. 4, in the filter tank 140, only the recyclable material aggregated on the filter net 145 remains, so that the recyclable composite sheet B may be formed. The recyclable composite sheet B formed after the draining operation (S50) contains a considerable amount of water, and contains about 120% of water compared to the recyclable composite sheet B.

In the vacuum dehydration operation (S60), a vacuum is formed in the filter tank 140 to reduce moisture in the recyclable composite sheet B. The vacuum dehydration operation (S60) is performed by operating the vacuum pump 161 while the drainage valve 151 is closed. The lower space 1412 of the filter tank 140 is sealed by the recyclable composite sheet B stacked on the filter net 145, and the air in the lower space 1412 passes through the drainage pipe 150 by the vacuum pump 161 so that a vacuum state may be formed in the lower space 1412. Thus, moisture contained in the recyclable composite sheet B is additionally removed.

By performing the vacuum dehydration operation (S60), the moisture content of the recyclable composite sheet B is lowered to a level of about 70% compared to the recyclable composite sheet B.

Figure 5:
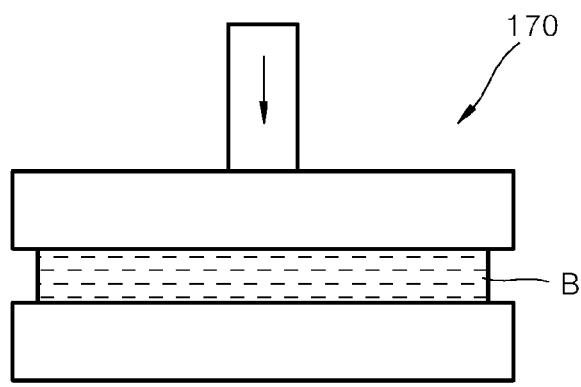
FIG. 5 illustrates the state in which a compression dehydration operation of the method of recycling a composite material of FIG. 2 is performed.

In the compression dehydration operation (S70), the recyclable composite sheet B that has undergone the vacuum dehydration operation (S60) is compressed by a press 170 to be additionally dehydrated, as shown in FIG. 5. By performing the compression dehydration operation (S70), the moisture content of the recyclable composite sheet B is lowered to about 40% compared to the recycling sheet B. In the present embodiment, it is described that compression is performed on one recyclable composite sheet B in the compression dehydration operation (S70). However, unlike this, it may be performed by compressing at the same time in a state in which several recyclable composite sheets B are stacked. It also belongs to the scope of the present invention.

In the drying operation (S80), the recyclable composite sheet B that has undergone the compression dehydration operation (S70) is heat-treated and dried in a high-temperature furnace. By performing the drying operation (S80), the moisture content of the recyclable composite sheet B is lowered to a level of about 3% compared to the recyclable composite sheet B. Although not shown, a shape blanking operation of punching the recyclable composite sheet B that has undergone the compression dehydration operation (S70) before the drying operation (S80) is performed into a shape close to a finished product may be further performed.

Figure 6:
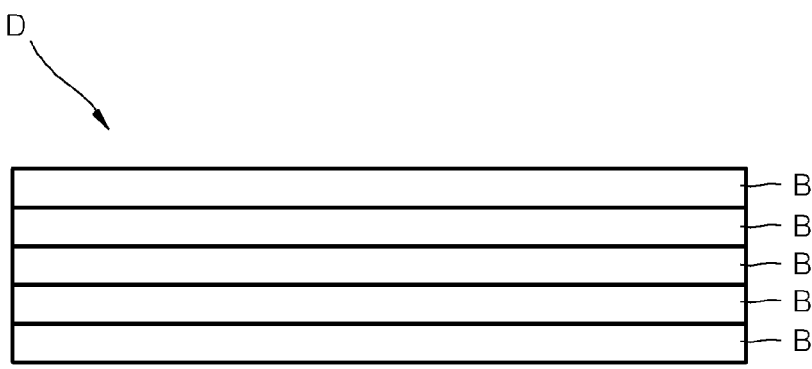
FIG. 6 is a side view illustrating a laminate formed by a stacking operation of the method of recycling a composite material of FIG. 2.

In the stacking operation (S90), a plurality of recyclable composite sheets B that have undergone the drying operation (S80) are stacked and bonded to form a laminate. FIG. 6 is a side view of a laminate D formed through the stacking operation (S90). The recyclable composite sheets B stacked in the stacking operation (S90) may be made of not only the same material but also at least two different types of waste fiber-reinforced plastic as raw materials. In this case, for interface reinforcing, reinforcing fibers may be added.

In the molding operation (S100), the laminate formed in the stacking operation (S90) is molded into the finished product by using a mold.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for recycling a composite material, the apparatus comprising:
 a mixing tank in which pulverized products of waste fiber-reinforced plastic are dispersed and mixed in water together with a filler to form a composite material mixture;
 a fixing agent addition part for supplying a fixing agent for aggregating the pulverized products of waste fiber-reinforced plastic and the filler to a nonwoven fabric mixture to form a recyclable material;
 a filter tank in which the recyclable material supplied thereto is received so that a recyclable composite sheet is formed;
 a mixture transfer pipe configured to transfer the composite material mixture stored in the mixing tank to the filter tank;
 a drainage pipe extending from the filter tank;
 a drainage valve installed in the drainage pipe and configured to open and close the drainage pipe; and
 a vacuum forming unit connected to the drainage pipe,
 wherein the fixing agent addition part supplies the fixing agent to the mixture transfer pipe and supplies the fixing agent to the composite material mixture,
 wherein the filter tank comprises a filter tank body for providing an inner space, and a filter net horizontally installed in the inner space so as to divide the inner space into an upper space and a lower space and allowing water in the recyclable material to pass therethrough downward,
 wherein the drainage pipe is connected to the lower space,
 wherein the vacuum forming unit comprises a vacuum pump, and a connection pipe diverged from the drainage pipe to extend and configured to connect the vacuum pump to the drainage pipe,
 wherein a point where the connection pipe is diverged from the drainage pipe, is located upstream of the drainage valve,
 wherein the recyclable material is supplied to the upper space.

2. The apparatus of claim 1, wherein the filter tank further comprises a net support body configured to support the filter net.

* * * * *